Sept. 20, 1966     B. J. GERSHEN     3,274,470
BRUSHLESS MOTOR MEANS

Filed Dec. 5, 1963     4 Sheets-Sheet 1

INVENTOR.
Bernard J. Gershen
BY
*His Attorney*

Sept. 20, 1966  B. J. GERSHEN  3,274,470
BRUSHLESS MOTOR MEANS
Filed Dec. 5, 1963  4 Sheets-Sheet 2

INVENTOR.
Bernard J. Gershen
BY
His Attorney

INVENTOR.
Bernard J. Gershen
BY
Albert H. Reutter
His Attorney

United States Patent Office 3,274,470
Patented Sept. 20, 1966

3,274,470
BRUSHLESS MOTOR MEANS
Bernard J. Gershen, Edison, N.J., assignor to General Motors Corporation, Detroit, Mich., a corporation of Delaware
Filed Dec. 5, 1963, Ser. No. 328,273
2 Claims. (Cl. 318—138)

This invention relates to brushless machines, and more particularly, to so-called totem-pole brushless direct current motor means.

Conversion of power to operate an alternating current motor from a direct current source can require complex and costly equipment. Also, problems of wear, arcing and sparking are encountered on brush-type machines limiting usefulness thereof wherever danger of explosion or fire exists. Predetermined circuit configurations including semiconductor devices arranged in a "single-ended-push-pull" and "half-bridge" configuration such as on amplifiers or oscillators are now made applicable also to a brushless D.-C. motor means as an object of the present invention.

Another object of this invention is to provide circuitry for operation of an A.-C. motor means of differing types including shaded pole, synchronous, induction, repulsion-induction, series wound as well as hysteresis from a D.-C. source in conjunction with semi-conductor means of NPN and PNP type add additional components to an effective A.-C.. signalling across a main motor winding free of need for brushes.

Another object of this invention is to provide a brushless D.-C. motor operating arrangement wherein load is the main motor winding and two feedback windings therewith used alternately to turn on first and second semiconductor devices for an effective A.-C. signal across the main motor winding thereby operating an A.-C. motor from a D.-C. source.

A further object of this invention is to provide various circuit configurations for "totem pole" brushless D.-C. motor operation including speed control thereof involving minimum increase or variation in input current with speed as well as starting and running torque substantially constant with speed.

Another object of this invention is to provide "totem pole" brushless D.-C. motor means in combination with dual tandem potentiometer means for speed control and operation with a pair of semi-conductor means alternately fired for an effective A.-C. signal across a main motor winding.

Further objects and advantages will become apparent from the following description, reference being had to the accompanying drawings wherein preferred embodiments of the present invention are clearly shown.

Figure 1:
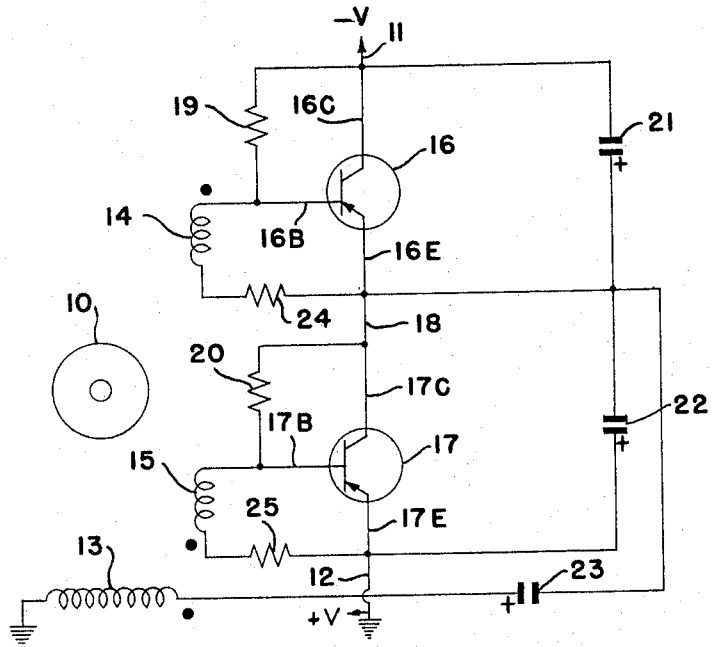
FIGURE 1 illustrates a first circuitry arrangement for "totem pole" brushless D.-C. motor means in accordance with the present invention.

In FIGURE 1 there is shown circuitry arrangement of brushless D.-C. motor means including a rotor portion journaled in a usual manner. As to energization of the stator portion of the motor means in FIGURE 1, it is to be noted that a direct current source is used with a negative connection being made to a line or lead 11 and a positive connection being made to a line or lead 12. Electrical load energized from this source can include a main motor winding 13 as well as a pair of feedback windings 14 and 15 used alternately to turn on semiconductor means 16 and 17 respectively. The semiconductor means can be transistors each having lead connections thereto for emitter identified by reference numerals 16E and 17E respectively, as well as for base identified by reference numerals 16B and 17B respectively. Also each semi-conductor means or transistor includes a connection for collector identified by reference numerals 16C and 17C respectively. Each emitter connection is comparable to a cathode of a vacuum tube means while each collector can be compared with a plate of vacuum tube means. In the circuitry of FIGURE 1, it is to be understood that the feedback winding portions 14 and 15 are wound on the same magnetic core as the primary winding portion 13 so that the feedback winding portions derive their power through transformer action and perform a function of applying an alternating current to bases 16B and 17B of the two transistors or semiconductor devices thus turning them on and off alternately. It is noted that bases of simiconductor means or transistors are comparable to grid of vacuum tube means.

In the circuitry of FIGURE 1, the collector 16C is connected to one end of the power supply or the negative line 11. The emitter 16E of the transistor 16 is connected by a juncture 18 to the collector 17C of the semiconductor means or transistor 17. There can be an impedance inserted at this juncture 18 though this insertion is not illustraed in FIGURE 1. The emitter 17E of the semiconductor means or transistor 17 is joined to an opposite end or positive supply line 12 of the power source. Load including windings on the field frame or magnetic core of the motor is connected from the emitter 17E of semiconductor means or transistor 17 then through a capacitor means to a point or juncture such as 18 at which the emitter 16E of semiconductor means or transistor 16 joins the collector 17C of semiconductor means or transistor 17. Starting resistance means 19 and 20 each have one end thereof interconnected with the bases 16B and 17B of semiconductor means or transistors 16 and 17 respectively, as well as to one end of the feedback winding portions 14 and 15 respectively. However, it is to be noted that both starting resistors means may not be required in some cases. Also in FIGURE 1, capacitance means 21 and 22 are used to absorb voltage spikes developed from collector to emitter of the transistors or semiconductor devices 16 and 17 respectively. Capacitance means 23 connected in series between the main motor winding portion 13 of the A.-C. motor and a juncture such as 18 to which the capacitance means 21 and 22 are also connected can have a value of capacitance large enough so the drop across capacitance means 23 under operating conditions is small compared to the supply voltage. The circuitry of FIGURE 1 as applied for a brushless D.-C. motor has the main motor winding 13 connected as load and two feedback winding portions 14 and 15 are used alternately to turn on the semiconductor means or transistors 16 and 17. This provides an effective A.-C. signal across the main motor winding portion 13 thereby operating an A.-C. motor from a D.-C. source. The feedback winding portions 14 and 15 being wound on the same field frame or magnetic core as the primary derive their power through transformer action and perform a function of applying an alternating current to the bases 16B and 17B of the two transistors or semiconductor means 16 and 17 respectively, thus turning them on and off alternately. Therefore, the circuitry shown in FIGURE 1 will provide oscillation at a frequency which if varied will vary the speed of the motor means. Provision for such variation in frequency is made in circuitry described subsequently herein.

Further in FIGURE 1, resistance means 24 and 25 are for the purpose of limiting drive current and therefore these resistance means 24 and 25 are connected in series with the feedback winding portions 14 and 15 respectively across the emitter 16E, base 16B, and emitter 17E, base 17B of semiconductor means or transistors 16 and 17 respectively. It should be noted that both NPN as well as PNP transistors or semiconductor means operate in the circuitry of FIGURE 1.

Figure 2:
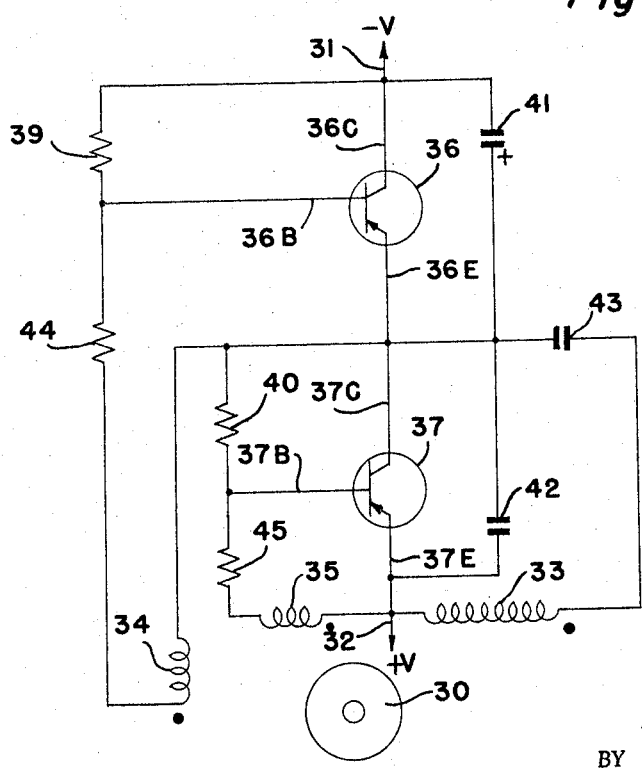
FIGURE 2 shows circuitry having refinements over that of FIGURE 1.

FIGURE 2 shows a slightly more practical circuit from the standpoint of winding a motor means having a rotor 30 as well as stator component energization from a suitable direct current source by way of a first lead or line connection 31 (negative) and a second lead or line connection 32 (positive). In FIGURE 2, there is provided a main winding portion 33 comparable to that identified by reference numeral 13 in FIGURE 1 as well as feedback winding portions 34 and 35 comparable to feedback winding portions 14 and 15 respectively in FIGURE 1. Semiconductor means 36 and 37 have emitters 36E and 37E as well as collectors 36C and 37C and base connections 36B and 37B respectively comparable to similar components in FIGURE 1. Starting resistor means 39 and 40 in FIGURE 2 are comparable to starting resistor means 19 and 20 in FIGURE 1. Capacitance means 41, 42 and 43 in FIGURE 2 are comparable to capacitance means 21, 22 and 23 respectively of FIGURE 1. Drive current limiting resistance means 44 and 45 in FIGURE 2 are comparable to resistance means 24 and 25 in FIGURE 1. Thus, so far as motor winding is concerned it is possible for the feedback winding portions and main winding portion to be more compactly arranged and accessible for connections thereto by arrangement of stator components as shown in FIGURE 2.

Figure 3:
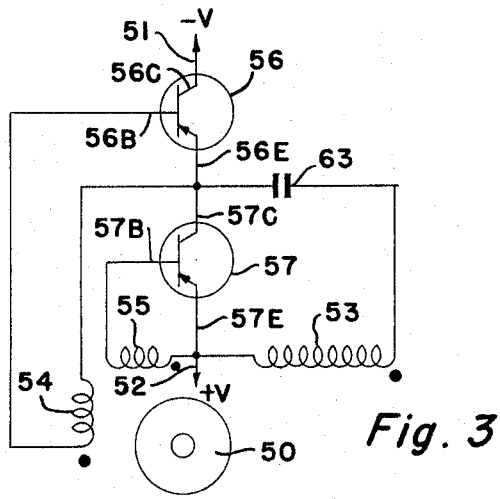
FIGURE 3 represents simplification of circuitry of FIGURE 2.

It is to be understood that the circuitry of FIGURES 1 and 2 will operate also without capacitance means 21-22 and 41-42 as well as resistance means 24-25 and 44-45. These capacitances may be required for voltage transient suppression and the resistances may be required for current limiting purposes. Therefore, in an illustration of FIGURE 3 these optional components are omitted to show basically only a motor means having a rotor portion 50 and stator component energization achieved from a suitable direct current source to which a first lead or line 51 (negative) and a second lead or line 52 (positive) can be connected. The stator components further include a main winding portion 53 comparable to the main winding portions 13 and 33 noted earlier as well as feedback winding portions 54 and 55 comparable to the feedback winding portions 14-15 and 34-35 in FIGURES 1 and 2 respectively. Semiconductor means 56 and 57 are shown in FIGURE 3 and these are comparable to the semiconductor means or transistors 16-17 and 36-37 in FIGURES 1 and 2 respectively. Similarly, the semiconductor means or transistors 56 and 57 have emitters 56E and 57E as well as collectors 56C and 57C and bases 56B and 57B. Only capacitance means 63 comparable to capacitance means 22 and 23 of FIGURES 1 and 2 respectively remains in the basic circuitry of FIGURE 3. In the illustrations of FIGURES 1, 2 and 3 there are large round dots at ends of windings 13-14-15, 33-34-35 and 53-54-55 respectively. By convention, all dot ends of windings are of the same polarity. Thus, assuming that the first semiconductor means 56 (comparable to transistors 16 and 36) is conducting, then the dot end of the primary winding portion 53 is negative and this end is connected to capacitance means 63 as shown in FIGURE 3. Similarly, the dot end of primary winding portions 13 and 33 are connected to capacitance means 23 and 43 respectively. Therefore, the dot end of feedback winding portion 54 (comparable with feedback winding portions 14 and 34 respectively) is also negative. Since this end of the feedback winding portion 54 is connected to the base 56B of the first semiconductor or transistor means 56, the semiconductor or tranistor means 56 remains conducting thereby confirming the original premise that the semiconductor means or transistor means 56 is conducting. At the same time, by auto transformer action, the base of the second semiconductor or transistor means 57 is kept positive and the second semiconductor means or transistor means is off. In most cases, the feedback winding portions such as 54, 34 and 14 will have the same number of turns as the second feedback winding portions 55, 35 and 15 respectively. In each of the circuits the first semiconductor means or transistors 56, 36 and 16 will conduct until capacitance means 63, 43 and 23 respectively discharge or there is reached a region of magnetic iron saturation. At this point, transformer action stops and the voltage induced in the first feedback winding portions 54, 34 and 14 is reduced. This reduces the drive to the bases 56B, 36B and 16B of the first semiconductor means or transistors 56, 36 and 16 respectively thereby reducing the collector current in the particular semiconductor or transistor means. This reduction of the collector current also reduces the current in the individual main winding portions 53, 33 and 13 respectively. A reduction of current in the main winding portions 53, 33 and 13 respectively is transferred to the primary feedback winding portions 54, 34 and 14 respectively by transformer action and the first semiconductor means or transistor means 56, 36 and 16 respectively can be turned off correspondingly faster. It is to be noted that in each of the circuits of FIGURES 1, 2 and 3 the current in the load or main winding portion 53, 33 and 13 respectively passes through the capacitance means 63, 33 and 13 respectively. When this switching has occured, the base such as 56B, 36B and 16B of the first semiconductor means or transistor means 56, 36 and 16 respectively is made positive and the base 57B, 37B and 17B of the second semiconductor means or transistor means 57, 37, 17 is made negative, thus turning the first semiconductor means such as 56, 36 and 16 off, and turning the second semiconductor means or transistor means 57, 37, 17 on. The second semiconductor means or transistor means 57, 37 and 17 respectively then discharges capacitance means 63, 43 and 23 respectively which in turn draws current through the secondary feedback winding portion 55, 35, 15 respectively in the opposite direction from the original premise. Current continues to flow in this direction until either the iron saturates or capacitance means such as 63, 43 and 23 discharges. Either action changes the direction of current flow in the secondary feedback winding portion 55, 35, 15 respectively, thus returning to the beginning of the cycle with the first semiconductor means or transistor means 56, 36, 16 conducting and the second semiconductor means or transistor means 57, 37, 17 cut off, respectively.

The circuitry of the drawings includes features of a so-called "totem pole," "single-ended-push-pull," and "half bridge" oscillator of which the windings are on the field or magnetic stator core of an alternating current or A.-C. motor means. The oscillator produces an alternating current or A.-C. signal from a D.-C. or direct current supply source thus providing brushless operation of the motor means. The capacitance values of capacitance means 63, 43 and 23, for example, must offer negligible impedance for the main winding portions 53, 33 and 13 respectively at the frequency of oscillation. Thus a resonance or tuned relationship exists between these components and then in the circuitry shown, oscillation will occur at such predetermined frequency. The main advantage of this circuitry is that the maximum voltage, disregarding spikes or temporary peaks, is approximately equal to the supply voltage which is across the transistor means from collector to emitter thereof. Thus, if the capacitance value of the capacitance means 63, 43 and 23 is sufficiently large, the voltage there across is much lower than the supply voltage. It is recognized that presently there are other brushless direct current motors. Circuitry is similar to that of D.-C. to A.-C. invertors and a major advantage of the circuitry disclosed herein is that the peak voltage appearing across the transistor means is equal to the supply voltage and not twice that value as encountered in other circuits. Thus, lower cost transistor means can be used. Furthermore, the capacitance means such as 63, 43 and 23, although of high value, can have relatively low voltage rating or a value less than that of supply voltage appearing across it.

Figure 4:
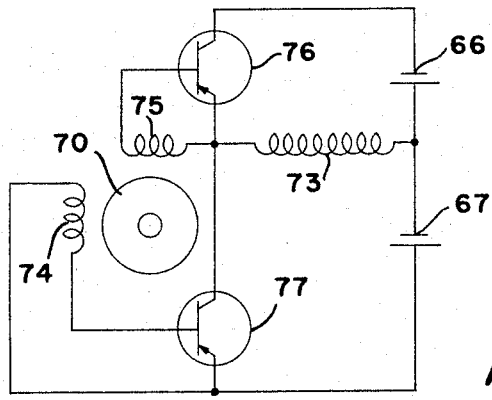
FIGURE 4 shows another circuit configuration with dual or tapped power supply.

FIGURE 4 shows another circuit configuration whereby capacitance means such as 63, 43 and 23 are eliminated though requiring two power supplies represented as batteries 66 and 67 or a tapped power supply rather than a single battery or direct current power supply required for the circuits in FIGURES 1, 2 and 3. Only basic components are shown in FIGURE 4 to represent a motor means having a rotor 70 as well as a main winding portion 73 as well as feedback winding portions 74 and 75 connected in circuitry with semiconductor means or transistor means 76 and 77 respectively. Availability of separate or tapped power supplies may not be as practical as provision of capacitance means in the circuitry of FIGURES 1, 2 and 3 though on-off operation of the pair of semiconductor means or transistors 76 and 77 can be accomplished in a manner similar to that described previously.

Figure 5:
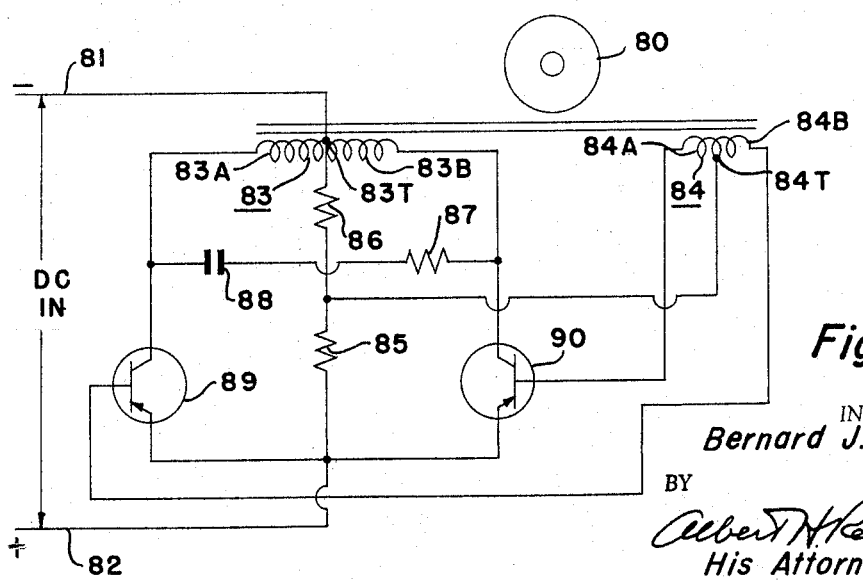
FIGURE 5 shows another embodiment of a push-pull brushless D.-C. motor means in accordance with the present invention.

In FIGURE 5 there is shown push-pull circuitry for a brushless D.-C. motor means having a rotor portion 80 and electrically energizable stator components supplied from a suitable direct current source for D.-C. input at a first lead or line 81 (negative) and a second lead or line 82 (positive). It is to be understood that such a brushless D.-C. motor means includes a field frame or magnetic stator core with which a main winding portion generally indicated by numeral 83 and a feedback winding portion generally indicated by numeral 84 can be provided. The main winding portion 83 has a center tap connection 83T to which the first supply line 81 is connected. This center tap divides the main winding portion 83 into sections 83A and 83B. Similarly, the feedback winding portion 84 has a center tap connection 84T thereto resulting in a division of this feedback winding into sections 84A and 84B. A resistance means 85 limits feedback current and a resistance means 86 is for cold starting. A juncture between the resistance means 85 and 86 is connected to the center tap 84T of the feedback winding portion 84 while opposite ends of the resistance means 85 and 86 are connected to supply line 82 and center tap 83T, respectively. A resistance means 87 and capacitance means 88 make up a new type of spike-transient supression network and are for de-spikinfi of voltage developed from semi-conductor means or transistors 89 and 90. Frequency of oscillation for the circuitry of FIGURE 5 is dependent upon impedance values of resistances 85 and 86 as well as of main winding portion 83 and feedback winding portion 84 and the core and voltage.

Figure 6:
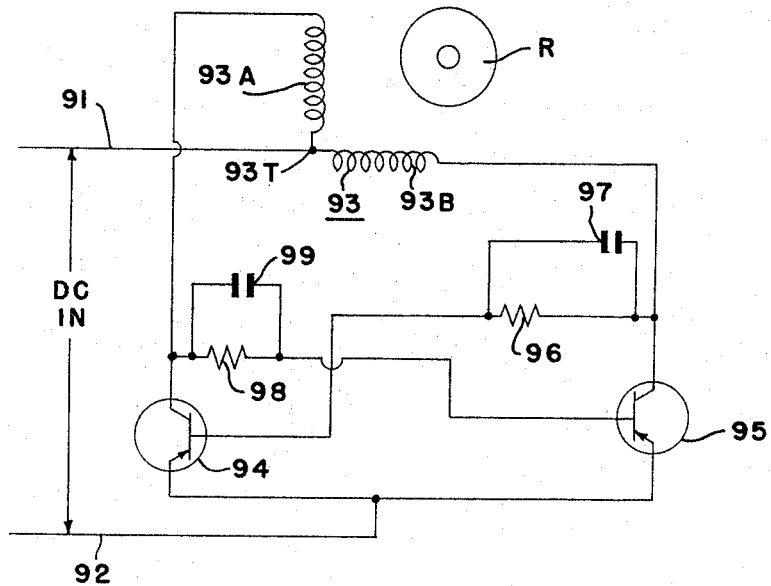
FIGURE 6 illustrates a push-pull circuit embodying a resistive-coupled brushless D.-C. motor means for which feedback does not come from separate winding but from resistor-capacitor networks further in accordance with the present invention.

FIGURE 6 illustrates a resistive-coupled brushless D.-C. motor means having a rotor R as well as a first power supply line 91 and a second power supply line 92, negative and positive respectively, from a suitable direct current supply source. The motor means includes a motor winding generally indicated by numeral 93 having a center tap 93T to which the first supply line 91 is connected. The motor winding 93 is wound on the motor core and as center tapped is divided into sectors 93A and 93B. Opposite ends of the winding sectors 93A and 93B are connected to collectors of semiconductor means or transistor means 94 and 95 respectively. The emitters of the semiconductor means or transistors 94 and 95 are connected to each other as well as to the second supply line 92. A resistance means 96 having a capacitance means 97 connected in parallel thereto is connected between the base of the first semi-conductor means or transistor means 94 and a juncture of the collector of the second semiconductor means or transistor means 95 and one end of the winding sector 93B. Similarly, a resistance means 98 having a capacitance means 99 in parallel therewith is connected between a base of the second semiconductor means or transistor means 95 and a juncture between the collector of the first semiconductor means or transistor means 94 and one end of the winding sector 93A. This circuitry of FIGURE 6 will oscillate with a frequency determined by the voltage, the resistors 96 and 98, the capacitors 97 and 99, the core and winding constance.

Figure 7:
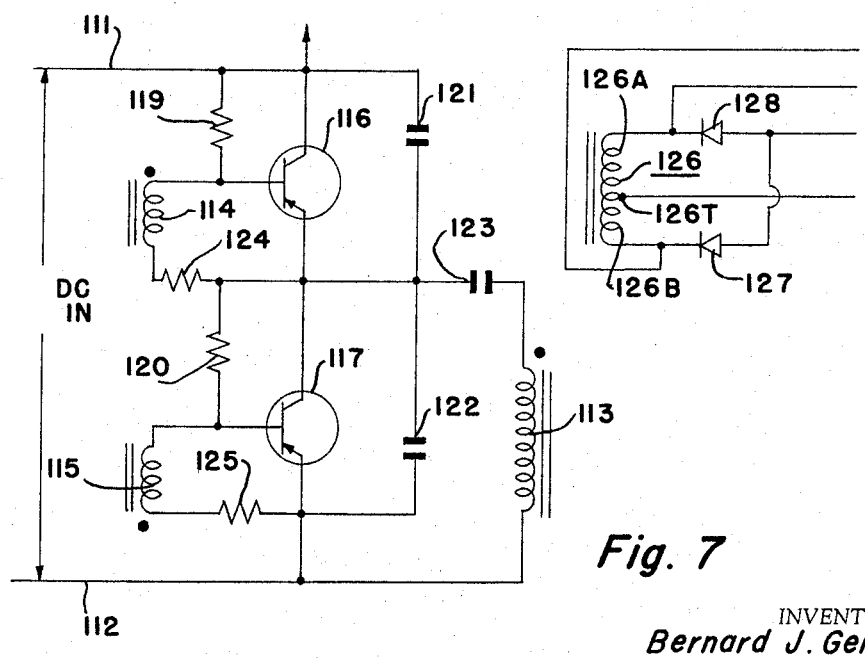
FIGURE 7 shows circuitry for "totem pole" D.-C. to D.-C. convertor or D.-C. to A.-C. inverter means.

Circuitry shown in FIGURE 7 uses features of the present invention similar to those of FIGURE 1 except that output is a direct current (D.-C.) or alternating current (A.-C.) voltage rather than motion. The components of FIGURE 7 includes a first supply line 111 from a suitable direct current source of power and identifiable as negative in polarity. Also connected to such a source (not shown) is a second supply line 112 designated as having positive polarity and connected to one end of a saturable core reactance or main winding portion 113. It is to be noted that in the embodiment of FIGURE 7, the windings are on a regular transformer structure rather than a motor frame. The embodiment of FIGURE 7 further includes feedback winding portions 114 and 115 similar to those identified by reference numerals 14 and 15 in FIGURE 1. However, in the embodiment of FIGURE 7 there is an additional winding portion from which power can be taken as described subsequently herein.

Circuitry of FIGURE 7 in association with the main winding portion 113 as well as the feedback winding portions 114 and 115 is substantially the same as described for circuitry of FIGURE 1. Thus, the first feedback winding portion 114 is connected to a base of a first semiconductor means or transistor means 116 and similarly one end of the second feedback winding portion 115 is connected to a base of a second semiconductor means or transistor means 117. Resistance means 119 and 120 are provided for a purpose similar to that of resistances 19 and 20 in the circuitry of FIGURE 1. Resistance means 119 and 120 thus are for starting purposes. Capacitance means 121, 122 and 123 are connected in the circuitry of FIGURE 7 in a manner similar to that of capacitance means 21, 22 and 23 respectively in FIGURE 1. Further resistance means 124 and 125 in the circuitry of FIGURE 7 serve a pupose similar to that of resistance means 24 and 25 in FIGURE 1.

As noted previously, the embodiment of FIGURE 7 includes the main winding portion 113 as well as the first and second feedback winding portions 114–115 and an additional fourth winding portion generally indicated by numeral 126 having a tap connection 126T thereto resulting in segments 126A and 126B of this fourth winding portion. Rectifier or diode means 127 and 128 are connected to opposite ends of winding segment 126B and 126A respectively, such that a direct current or D.-C. output voltage can be taken from a lead connected to the tap position 126T and a common juncture of one side of the rectifier means 127–128. Location of this fourth or extra winding 126 with the transformer core shared by the winding portions 113–114–115 also permits taking an alternating current or A.-C. voltage output directly from the opposite ends of the segments 126A and 126B of the fourth or additonal winding portion 126 irrespective of the rectifier means 127 and 128. Thus the circuitry of FIGURE 7 provides a "totem pole" D.-C. to D.-C. convertor or D.-C. to A.-C. inverter means.

Figure 8:
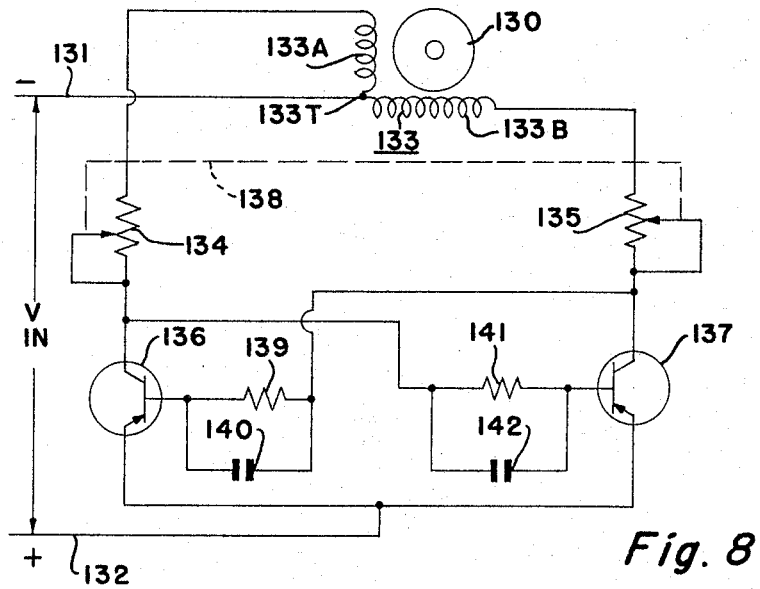
FIGURE 8 is a circuit configuration including push-pull brushless D.-C. motor means speed control.

Provision of a fourth winding on a magnetic core can be used for varying saturation level of the magentic iron core due to variation of current in the fourth winding and thereby permitting variation of frequency to vary motor speed. Additional methods of changing speed can also be used. FIGURE 8 illustrates circuitry for at least one such speed control for brushless D.-C. motor means having a rotor portion 130 journaled in a well-known manner and a stator winding means energizable from a direct current source of supply to which a first supply line 131 of negative polarity as well as a second supply line 132 of positive polarity can be provided for electrical energization of stator components. Motor winding means generally indicated by numeral 133 in FIGURE 8 have a tap connection 133T thereto to which the first supply line 138 is secured such that winding segments 133A and 133B are provided on either side of the tap 133T. Opposite ends of the winding segments 133A and 133B are connected to variable resistance means 134 and 135 respectively which are in series between the ends of the winding segments as connected therebetween to a collector lead of first and second semiconductor means or transistor means 136 and 137. The variable resistance or potentiometer means 134–135 can have movable arms interconnected to each other as represented by a link 138 for speed control. Emitters of the semiconductor means or transistor means 136 and 137 are connected to each other in a common juncture with the second supply line 132 as shown in FIGURE 8. A base of the semiconductor means 136 has a resistance means 139 in shunt with a capacitance means 140 connected therebetween with a juncture between one end of the variable resistance means or potentiometer means 135 and collector of semiconductor means or transistor means 137. Similarly, a base of semiconductor or transistor means 137 has a resistance means 141 in shunt with a capacitance means 142 connected therebetween to a juncture from one end of the variable resistance means or potentiometer means 134 and collector of semiconductor means or transistor means 136. Major advantages of the circuitry for speed control as shown in FIGURE 8 include features that speed is variable from zero to a maximum value, that there is little increase or variation in input current with respect to speed, and that starting and running torque is substantially constant with speed.

Figure 9:
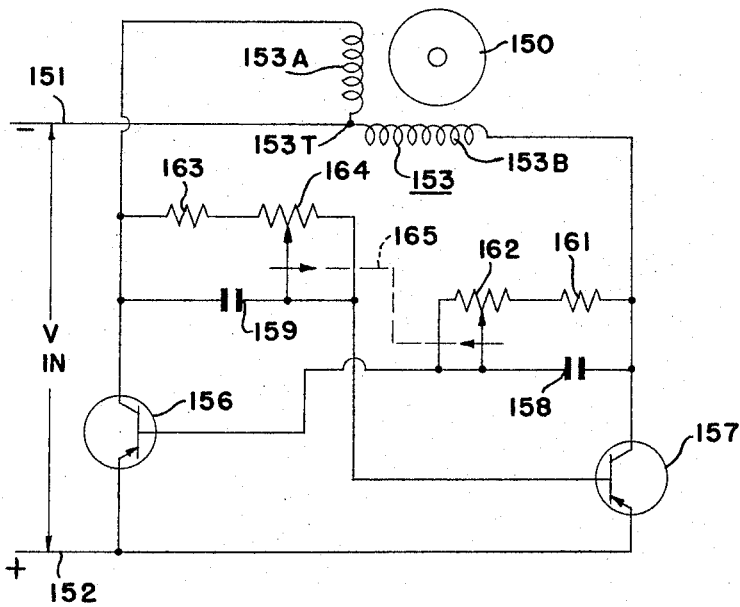
FIGURE 9 is another embodiment of push-pull brushless D.-C. motor means speed control using a dual-tandem potentiometer means.

Circuitry of FIGURE 9 differs from that of FIGURE 8 as to connection of resistance and potentiometer means. Thus, in FIGURE 9 there is provided a motor means having a rotor portion 150 as well as an electrically energizable stator circuitry supplied with power from a suitable source from a first supply line 151 of negative polarity and a second supply line 152 of positive polarity. The stator circuitry includes a winding portion generally indicated by numeral 153 having a tap connection 153T therewith to which the first supply line 151 is connected. The winding portion 153 is thus divided into winding segments 153A and 153B on either side of the tap 153T. In the embodiment of FIGURE 9, the opposite ends of the winding segments 153A and 153B are connected directly to collectors of first semiconductor means or transistor means 156 and second semiconductor means or transistor means 157 respectively. A base of the semiconductor or transistor means 156 is connected to one side of capacitance means 158 and an opposite side of this capacitance means is connected to the collector of the semiconductor means or transistor means 157. Similarly, a base of the semiconductor or transistor means 157 is connected to one side (positive) of capacitance means 159 and an opposite side of this capacitance means 159 is connected to a juncture with the collector of the first semiconductor means or transistor means 156. Capacitance means 158 has both a fixed resistance means 161 and variable resistance means 162 in series with each other though together in shunt or parallel across the capacitance means 158. Similarly, the capacitance means 159 has a fixed resistance means 163 and a variable resistance or potentiometer means 164 in series with each other and together in shunt or parallel across the capacitance means 159. A mechanical interconnection 165 of the movable arms for the potentiometer means 162 and 164 can provide variation of the total amount of resistance in parallel with the capacitance means thereby changing the resonant condition or frequency of oscillation in accordance with change and control of speed obtained by a dual-tandem potentiometer means in the circuitry of FIGURE 9.

Features of the present invention can be applied to automotive fan motors. Circuitry in accordance with the present invention can be used not only for shaded pole motors but also synchronous, induction, repulsion-induction, series wound and hysteresis alternating current motor means. As to calculation of frequency of oscillation during operation of such motor means, it is to be understood that usual transformer calculation formulas can be used only for approximation purposes since square loop iron is not used in motors and since the speed of the motor rotor reflects back a varying inductance.

While the embodiments of the present invention as herein disclosed constitute preferred forms, it is to be understood that other forms might be adopted.

What is claimed is as follows:

1. Energizing arrangement from a direct current supply line source for D.-C. to D.-C. convertor as well as D.-C. to A.-C. inverter means, comprising, electromagnetic core means shared by four winding portions including a main winding portion, a pair of feedback winding portions and an additional output winding portion all fixed in location, a pair of semi-conductor means each having base, collector and emitter portions thereof, each feedback winding portion having connection between base and emitter portions of respective semi-conductor means, an emitter portion of one semi-conductor means being connected to a collector of the other semi-conductor means in a common juncture also shared by capacitance means at least in series with said main winding portion which is connected to a connection of one side of supply line and emitter portion of one of said semi-conductor means which a remaining side of supply line source is connected to collector portion of said other semi-conductor means, and a pair of rectifier means connected to opposite ends of said additional winding portion also having a tap connection thereto for direct current output therefrom and having alternating current output directly from opposite ends of said additional winding portion.

2. The arrangement of claim 1 wherein a total of three capacitance means are joined to said common juncture such that capacitance means are connected across collector and emitter portions of each of said semi-conductor means for voltage spike control, resistance means in series with each of said feedback winding portions for limit of drive current, and separate resistors each connected between collector and base portions of respective semi-conductor means for starting operation.

References Cited by the Examiner
UNITED STATES PATENTS

| | | | |
|---|---|---|---|
| 2,814,769 | 11/1957 | Williams | 318—138 |
| 2,965,856 | 12/1960 | Roesel | 331—113.1 |
| 2,995,690 | 8/1961 | Lemon | 318—138 |
| 3,098,958 | 7/1963 | Katz | 318—138 |
| 3,124,733 | 3/1964 | Andrews | 318—138 |
| 3,210,689 | 10/1965 | Burwen | 331—113.1 |
| 3,215,952 | 11/1965 | Massey | 331—113.1 |
| 3,221,270 | 11/1965 | Tillman et al. | 331—113.1 |

ORIS L. RADER, *Primary Examiner.*

S. GORDON, G. SIMMONS, *Assistant Examiners.*

UNITED STATES PATENT OFFICE
CERTIFICATE OF CORRECTION

Patent No. 3,274,470                          September 20, 1966

Bernard J. Gershen

It is hereby certified that error appears in the above numbered patent requiring correction and that the said Letters Patent should read as corrected below.

Column 6, line 5, for "supression" read -- suppression --; same line, for "de-spikinfi" read -- de-spiking --; column 8, line 64, for "which" read -- while --.

Signed and sealed this 22nd day of August 1967.

(SEAL)
Attest:

ERNEST W. SWIDER
Attesting Officer

EDWARD J. BRENNER
Commissioner of Patents